C. UEBELMESSER.
FILM RECEPTACLE AND SUPPORT THEREFOR.
APPLICATION FILED MAR. 11, 1915.
1,320,589.   Patented Nov. 4, 1919.
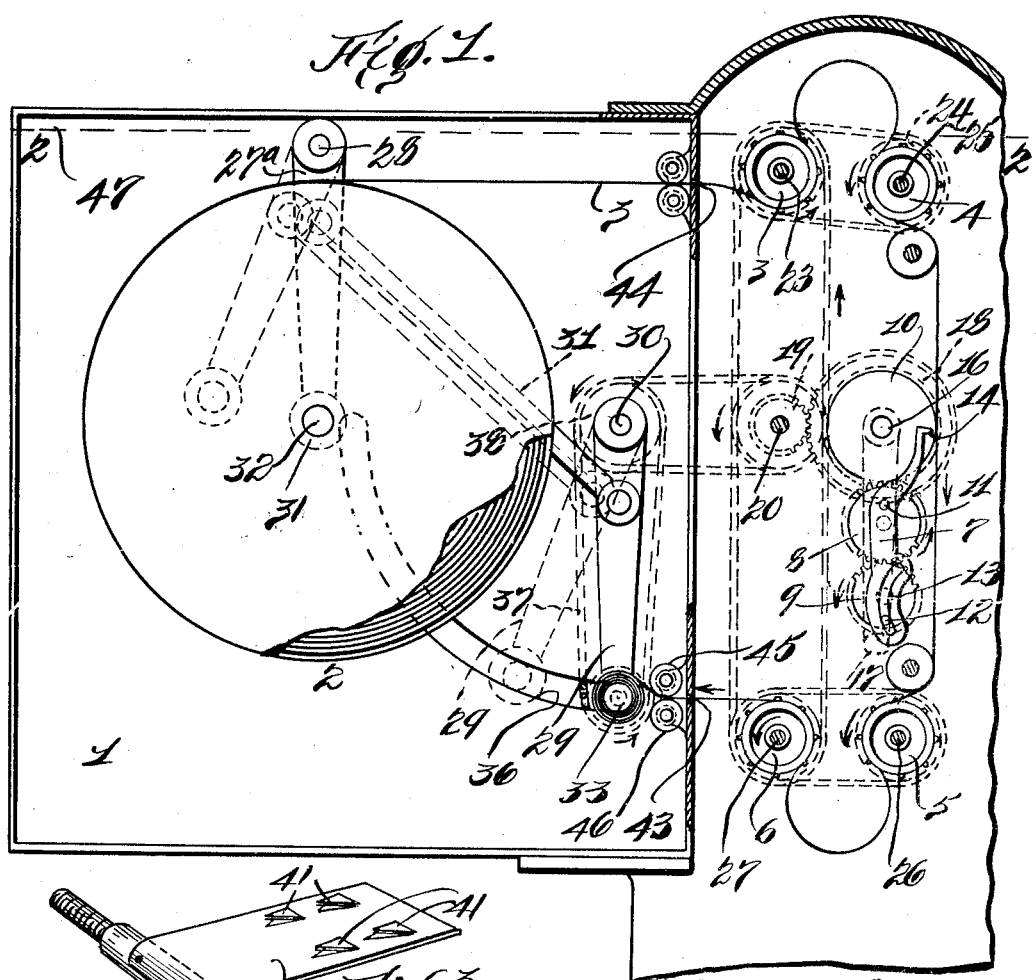
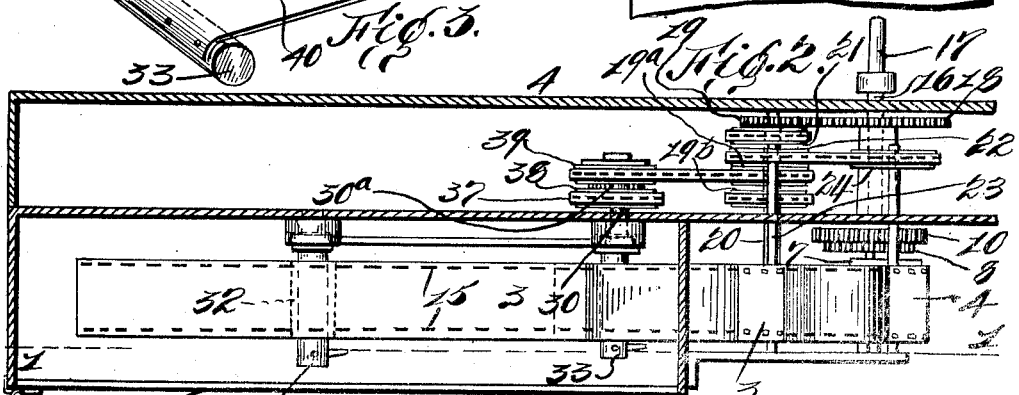

UNITED STATES PATENT OFFICE.

CHARLES UEBELMESSER, OF NEW YORK, N. Y., ASSIGNOR TO CRU PATENTS CORPORATION, A CORPORATION OF NEW YORK.

FILM-RECEPTACLE AND SUPPORT THEREFOR.

1,320,589.  Specification of Letters Patent.  Patented Nov. 4, 1919.

Application filed March 11, 1915. Serial No. 13,814.

*To all whom it may concern:*

Be it known that I, CHARLES UEBELMESSER, a subject of the Emperor of Germany, residing at New York city, in the county and State of New York, have invented certain new and useful Improvements in Improved Film-Receptacles and Supports Therefor, of which the following is a clear, full, and exact description.

This invention relates to an improvement in motion picture devices but relates more particularly to the film receptacle and support therefor.

One object of this invention is to provide a reel receptacle arranged to retain a reel of film and also to permit the reel to be unwound, and rewound within the same box or receptacle, the said film being caused to pass adjacent to a lens exteriorly of the receptacle therefor. By means of my improvement a large amount of space is saved, an extra film reel receptacle being obviated, consequently the size of the motion picture apparatus can be greatly reduced in size.

In the drawings which form part of this specification—

Figure 1 is a sectional view illustrating diagrammatically the mechanism for operating a film and also my improved means for supporting a film reel.

Fig. 2 is a sectional plan view thereof, the section being taken on a line 2—2 in Fig. 1.

Fig. 3 is an enlarged perspective view of a portion of my improvement.

Fig. 4 is an enlarged sectional detail view of the lower portion of the rewinding arm.

As herein illustrated my improvement consists of a receptacle 1 for containing a reel of film 2 which is operated by suitable sprockets 3, 4, 5 and 6 and a film advancing hook 7 of any well known type. The hook 7 is operated to advance the film 3 by intermeshing gears 8 and 9, said gears being rotated by a gear 10 meshing with the gear 8. The gear 8 is pivoted to the hook at 11 and is therefore reciprocated vertically when the gear 8 is rotated. The gear 9 carries a pin 12 engaging a slot 13 in said hook 7. The rotation of the gear 9 causes the hook to reciprocate whereby the end 14 is caused to engage the openings 15 in the film 3 at the end of the upward stroke of the hook 7 and to leave the openings at the lower end of the stroke of the hook 7. This form of film advancing device is well known.

To operate the gears 8, 9 and 10 I mount upon the shaft 16, of the gear 10, an operating handle 17. The shaft 16 also carries a gear 18 which drives a gear 19 which in turn operates four sprockets, two only, $19^a$ and $19^b$, being shown in Fig. 2, all of which are carried by a shaft 20. The sprocket gears on the shaft 20 operate other sprockets 21 and 22 on a shaft 23 which operate a sprocket 24 on the shaft 25 for the film sprocket 4, the film sprocket 3 being carried by the shaft 23. The lower film sprockets 5 and 6 are carried by shafts 26 and 27 respectively, said shaft being operated from the shaft 20 by a system of sprocket gears and chains. The above mentioned mechanism is merely an arbitrary form of film operating mechanism and is in no way essential to my invention.

This invention comprises a film supporting mechanism consisting of an arm $27^a$ pivoted at 28 to the receptacle 1, an arm 29 also pivoted to the receptacle 1 at 30, a link 31 connecting said arms, and means to wind the film. The above mechanism is one way of carrying out my invention. Other means might be employed without departing from the spirit of the invention. For the sake of clearness I will term the arm $27^a$ the carrier arm and the arm 29 the rewinding arm, although both arms carry the film.

To carry out my invention I preferably employ a film band such as 3 wound upon a spool 31, which can be slipped onto the carrier spindle 32, said spool not having any flanges.

The rewinding arm 29 is provided with a rotatable spindle 33, Fig. 4 driven by a sprocket 34, in this instance. The spindle 33 is threaded into a shaft 35 driven by the sprocket 34. The shaft 35 travels in a slot 36 in the casing 1 in this instance.

The gear 34 is operated by a chain 37 passing around a sprocket gear 38 loosely mounted on the pivot-pin 30 for the arm 29. The gear 38 is secured at $30^a$ to a sprocket gear 39 also loose upon the pin 30. To facilitate the securement of the film to the spindle 33 I provide the said spindle with a tab 40 of any flexible material thin enough to be wound upon the spindle 33. From the material of the tab I strike out fingers 41 arranged to engage the openings 15 in the film 3.

To thread the film 3 I open the door 42 of the casing 1, that is when I load the device, and pass the tab 40 through the opening 43 in the casing 1. I then place the reel 31 upon the spindle 32 and thread the end thereof through the opening 44 in the casing thence around the various sprockets. I finally cause the fingers on the tab 40 to engage the end openings 15 in the film and operate the machine enough to wind a few feet of film upon the spindle 33. As this device is more especially intended for motion picture cameras the above operation will be performed in a dark-room.

While the device is operating, to photograph a scene, for instance, the amount of film upon the spindle 33 will increase and the amount upon the spindle 31 will decrease until the entire film is taken from the spool 31 and wound upon the spindle 33.

As the roll of film upon the spindle 33 increases in size it will gradually swing the arm 29 to the left due to its contact with the guide rollers 45 and 46.

As the arm 29 swings to the left the arm 27$^a$ will also swing to the left due to the provision of the connecting link 31. As the roll of film upon the spindle 33 increases it will be moved toward the center of the casing 1, in this instance, and the decreasing roll upon the spindle 31 will move toward the upper corner 47, and when the film is entirely used up it will have been wound upon the spindle 33 and the arms 27$^a$ and 29 will be reversed in position. By this means I am able to utilize a single receptacle within which a film can be placed, unwound, and rewound upon another carrier.

The apparatus can now be carried to a dark room and the film taken out. To remove the film, I remove the spindle 33 from the sprocket 34 and slide it out of the arm 29. I may place another spindle such as 33 in position or wait until the film is developed and use the same spindle that was removed. When the film is unwound from the spindle the tab 40 can be easily removed. The gear 34 is connected to the spindle 33 by a friction clutch mechanism 48 to keep said spindle from running ahead of the other sprockets when the roll thereupon reaches a relatively large diameter.

As has been stated, the film advancing mechanism is merely diagrammatic to illustrate a motion picture camera.

What I claim is:

1. In a motion picture device a receptacle to contain a film, a movable carrier therefor, means to feed said film from said receptacle, a separate rewinding movable carrier within said receptacle and means to rewind said film upon said rewinding movable carrier.

2. In a motion picture device a receptacle to contain a film, a movable carrier therefor, means to feed said film from said receptacle, a separate movable carrier within said receptacle, means to rewind said film upon said rewinding movable carrier, and means connecting said carriers.

3. In combination with a motion picture device, a film receptacle, a movable carrier for said film, means to feed said film while on said carrier, an independent movable carrier to receive said film as it is fed from the carrier first named, and means to move said carriers simultaneously in the same direction.

4. In a motion picture device a film receptacle, a carrier for said film consisting of a pivoted arm within said receptacle, means to feed said film from said carrier, a second pivoted arm carrier within said receptacle, a rotatable spindle carried thereby to rewind said film, means to rotate said spindle, and means to cause said arms to move in the same direction while said film is being rewound.

5. In a motion picture device, a film receptacle, a movable carrier for said film, a second movable carrier within said receptacle, means connecting said carriers, means carried by the second carrier to receive and rewind said film, and means to move said carriers simultaneously as the diameter of the rewinding film increases.

Signed at New York city, New York, this 4th day of March, one thousand nine hundred and fifteen.

CHARLES UEBELMESSER.

Witnesses:
ROBERT RICHTER,
FRED FREISS.